United States Patent [19]

Kuriyama et al.

[11] Patent Number: 4,561,982

[45] Date of Patent: Dec. 31, 1985

[54] SCALE INHIBITOR

[75] Inventors: Yasuhisa Kuriyama; Syoichiro Kajiwara, both of Tokyo; Fumikazu Ozaki, Hiratsuka, all of Japan

[73] Assignee: Mitsubishi Gas Chemical Company, Inc., Tokyo, Japan

[21] Appl. No.: 543,586

[22] Filed: Oct. 19, 1983

[30] Foreign Application Priority Data

Oct. 25, 1982 [JP] Japan ............................... 57-187294

[51] Int. Cl.⁴ ............................................... C02F 5/10
[52] U.S. Cl. .................................... 210/698; 252/180; 252/181; 536/105
[58] Field of Search ....................... 252/180; 536/105; 210/698

[56] References Cited

U.S. PATENT DOCUMENTS 3,400,078  9/1968  Jones ..................... 252/180
3,596,766  8/1971  Johnston et al. .......... 252/180
3,629,121 12/1971  Eldib ..................... 536/105
3,873,614  3/1975  Lamberti et al. .......... 536/105

FOREIGN PATENT DOCUMENTS 1233128  5/1971  United Kingdom ............... 252/180
1250516 10/1971  United Kingdom .
1291895 10/1972  United Kingdom .

Primary Examiner—Prince E. Willis
Assistant Examiner—Robert A. Wax
Attorney, Agent, or Firm—Armstrong, Nikaido, Marmelstein & Kubovcik

[57] ABSTRACT

The present invention relates to a scale inhibitor for water and aqueous systems.

The scale inhibitor comprising an oxidized polysaccharide containing, as the essential units, carboxyl group-bearing units of the formula:

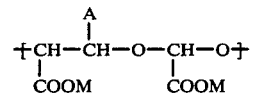

where A is $CH_2OR$, R is H, $(CH_2)_nCOOM$ or COOM, M is H, an alkali metal ion, or an ammonium group, and n is an integer from 1 to 3, obtained by the oxidative cleavage of polysaccharides containing 6-membered monosaccharide rings.

5 Claims, No Drawings

SCALE INHIBITOR

BACKGROUND OF THE INVENTION

The present invention relates to a scale inhibitor for water and aqueous systems, and more particularly to an agent made of oxidized polysaccharide that inhibits the formation of scales.

Recent industrial growth and development has resulted in the utilization of vast quantities of water, to the point where a curtailment in the use of cooling water, demand for which is especialy large, has become necessary and desirable. Because of this, the recirculating of cooling water has become unavoidable in office buildings and factories, and the number of water systems practicing high-concentration operation, which keeps the amount of blowdown to an absolute minimum and keeps the high-concentration of salts in recirculating water, is increasing. Ions normally present in water, such as calcium ions, magnesium ions, carbonate and bicarbonate ions, sulfate ions, and silicate ions, tend to build up in water systems such as these. This results in the deposition of sparingly soluble salts on the heat exchanger, leading to scale formation, which reduces the heat exchange capability and causes clogging and other problems. Such scaling problems are not restricted only to cooling water systems, but occur also in boiler water systems, and in water and aqueous systems in desalination plants, geothermal plants, iron mill stack gas and dust collector effluent systems, incinerators, and pulp mill digester liquor and waste liquor evaporators.

Polyphosphates such as sodium tripolyphosphate and sodium hexametaphosphate have hitherto been used to prevent such scaling. However, because these are phosphorus-containing materials, when discarded as waste, they cause the eutrophication of sea areas, rivers, and lakes. Yet another problems is that these compounds are hydrolyzed in water to form orthophosphoric acid, which results, paradoxically, in the formation of calcium phosphate scales. For these and other reasons, phosphonic acids such as monoaminotrialkylphosphonic acid, hydroxyalkylidenediphosphonic acid, monophosphonopolycarboxylic acid, and synthetic polyelectrolytes such as polyacrylic acid and polymaleic anhydride are being used of late. Yet, although the resistance to hydrolysis in water of these phosphonic acids, for example, is greater than scale inhibitors previously used, the fact remains that, as phosphorus substances, these cause eutrophication. Another drawback is that, of the synthetic polyelectrolytes, polyacrylic acid has a relatively limited effectiveness, and polymaleic anhydride is expensive.

Moreover, in cases containing large amounts of silicate ion, the effectiveness of these chemicals is greatly reduced or virtually suppressed altogether.

We conducted studies aimed at coming up with safe new scale inhibitors capable of replacing the agents currently in use, but containing no phosphorus. In the course of our investigations, we discovered that oxidized polysaccharides containing carboxyl group-bearing units, which obtained by the oxidative cleavage of natural polysaccharides having 6-membered monosaccharide rings, exhibit highly effective scale inhibitive properties.

This led ultimately to the present invention, which relates to a scale inhibitor comprising an oxidized polysaccharide containing, as the essential structural units, carboxyl group-bearing units of the formula:

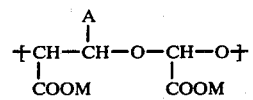

where A is $CH_2OR$, R is H, $(CH_2)_n$—COOM, or COOM, M is H, an alkali metal ion, or an ammonium group, and n is an integer from 1 to 3, obtained by the oxidative cleavage of polysaccharides containing 6-membered monosaccharide rings.

The polysaccharides containing 6-membered rings used as the starting material in the formation of the scaling inhibitor of the present invention is a polysaccharide having vicinal hydroxyl groups. Examples include starches such as corn, potato, rice, arrowroot, and tapioca, dextrin, cellulose, sawdust, polyuronic acids such as alginic acid, agar, and natural rubbers such as gum arabic. Substances such as starch, dextrin, and cellulose that have undergone partial chemical modification, such as hydrolysis, esterification, etherification, or carboxylation, may also be used. Of these, the use of starches, cellulose, or their carboxymethyl ethers are preferred because of their availability, price, reactivity, and other factors. The best choice of all is a starch.

Techniques that may be used to oxidize these polysaccharides include methods that employ well-known oxidizing agents, such as halogens, hypochlorites and other halides, chromic acid, permanganate, and the hydrogen peroxide-iron salts, capable of cleaving the glucose groups and introducing carboxyl groups; and methods involving treatment with well-known oxidizing agents, such as periodic acid, lead tetraacetate, silver salts-persulfuric acid, copper chloride, copper hydroxide, and thallium salts, capable of cleaving glucose groups and introducing aldehyde groups, followed by treatment with well-known chemicals capable of converting the aldehyde groups into carboxyl groups, such as a halogen, hydrogen peroxide, or nitric acid. In terms of reactivity and cost, methods consisting of one-step oxidation using sodium hypochlorite, halogens such as chlorine or halides are especially favorable here.

The polysaccharide and oxidizing agent may be reacted by any well-known method employed for the particular oxidizing agent. For example, when sodium hypochlorite or a halogen such as chlorine is used as the oxidizing agent, the desired product can readily be obtained by reaction for one to several hours at room temperature or under heating at a pH maintained within the range of 7–10. Best results can be obtained at a pH 8–9.

There is no need for the polysaccharide starting material to be oxidized until fully converted to a structure containing the carboxyl group-bearing units depicted in the above formula. Substances such as the oxidized starch sold commercially as paste for use in the paper-making industry and elsewhere are also noted to have a scale inhibiting effect, although these are oxidized only to a limited degree, with just several percent of the glucose units within the molecule containing carboxyl group-bearing units. However, a fairly large amount of this type of oxidized polysaccharide is required to provide an adequate scale-inhibiting effect. In addition, prior to use, it must be heated and dissolved, further detracting from its practicability. Therefore, in order for this substance to exhibit good properties as a scale inhibitor, at least 10% of the glucose units within the molecule should contain carboxyl group-bearing units. And for maximum performance and properties as a scale inhibitor, at least 40% should contain carboxyl group-bearing units. Oxidized polysaccharide that has been modified such that at least 40% of the glucose units within the molecule contain carboxyl group-bearing units becomes an aqueous solution, are ideally suited for addition as a scale inhibitor to water.

The amount of oxidizing agent added to the polysaccharide starting material need only be that amount required to oxidize the polysaccharide to the point where the polysaccharide molecule contains the carboxyl group-bearing units in the above proportion. In general, the greater the amount of oxidizing agent added, the higher the ratio of the carboxyl group-bearing units represented above in the formula. For example, when using sodium hypochlorite, to obtain a content of carboxyl group-bearing units of about 5% based on the starting material, it is necessary merely to add an amount corresponding to 0.5 equivalent of effective chlorine per equivalent of glucose units in the polysaccharide. And to obtain a product containing at least 40% of carboxyl group-bearing units, the addition of at least 2 equivalents is needed.

The carboxyl group-bearing units in the oxidized polysaccharide serving as the scale inhibitor according to the present invention may be arranged in any order within the molecule. Furthermore, in addition to the carboxyl group-bearing units, unreacted glucose units and cleaved aldehyde group-bearing units may also be present in the oxidized polysaccharide.

It is not clear in what form these units are present in the oxidized polysaccharide; i.e., whether they exist as mixtures of various polysaccharide molecules, or as regular or irregular copolymers. In addition, the molecular weight of the oxidized polysaccharide varies depending on the molecular weight of the polysaccharide as starting material, the type of oxidizing agent, and the reaction conditions. But, what is of most crucial importance in the present invention is that the product contains the carboxyl group-bearing units represented by the formula given above.

The oxidized polysaccharides obtained are generally low molecular weight polymers having a smaller degree of polymerization than the starting material. This can be determined, for example, by iodine color reactions or viscosity measurements with starch as the starting material.

The oxidized polysaccharide thus obtained may be used directly in the form of the reaction product, but it is also possible to neutralize the product, reduce the moisture content through concentration, or obtain a powder by precipitation and recovery from an organic solvent such as an alcohol or acetone.

The amount of the oxidized polysaccharide added to water or aqueous systems as the scale inhibitor in the present invention varies with the condition or degree of scaling and the content of carboxyl group-bearing units, but in general lies within a range of 1 to 1000 ppm, and preferably 1 to 100 ppm. For example, when the ratio of carboxyl group-bearing units is 40% or more, the addition of 1–20 ppm is sufficient. In such cases, the addition of more than 20 ppm does not provide a significant improvement in effectiveness.

Addition to a water or aqueous system may be continuous or intermittent, but in either case, it is desirable that control be applied to the system such that the above effective concentration is maintained therein.

Known polymers or copolymers having carboxyl substituted ethylenic hydrocarbons as monomeric constituents, e.g., the polyacrylic acid or hydrolyzed polymaleic anhydride or the water-soluble salts, may be used in combination with the scale inhibitor according to the present invention. The joint use of such polymers or copolymers can be very effective when the water or aqueous system being treated is characterized by certain special conditions, especially high temperature.

These polymers or copolymers may be, for example, ethylenic hydrocarbon polymers having carboxylic groups such as acrylic acid, methacrylic acid, maleic acid, maleic anhydride, fumaric acid, fumaric anhydride, itaconic acid, and crotonic acid; copolymers of these monomers or of these monomers and other polymeric vinyl monomers, e.g., acrylonitrile, acrylamide, methacrylamide, vinyl acetate, styrene, styrene derivatives, ethylene, n-butylene, and isobutylene; or the hydrolysates or water-soluble salts of these polymers or copolymers. Copolymers with other polymeric vinyl monomers that are generally used have a mole ratio of ethylenic hydrocarbons having the above carboxyl groups to other polymeric vinyl monomers of from 1:1 to 100:1. These may be known polymers or copolymers, such as those cited in Japanese Patent Publication Nos. 44-11791 and 53-20475. Of these, in terms of availability, price, and other factors, it is most desirable to use polyacrylic acid or its water-soluble salts, or hydrolyzed polymaleic anhydride or its water-soluble salts. These are generally used at molecular weights of not more than 100,000 for optimal dispersability and flocculating ability, but normally at not more than 50,000, and for best results, at about 500–15,000.

When these polymers or copolymers are used together with the scale inhibitor according to the present invention, the mixing ratio by weight of scale inhibitor to polymer or copolymer is from 9:1 to 1:3, and preferably from 5:1 to 1:1.

As for the method of mixture, it is possible to either add a premixed formulation to the water or aqueous system, or to add the components separately and have them mix within the system. The amount added depends on the condition or degree of scaling, the water or aqueous system conditions, and other factors. In general, however, the concentration within the water or aqueous system should lie in the range 0.1–100 rpm. At too low concentrations, not enough of an anti-scaling effect is produced, whereas use in quantities exceeding this range is costly without producing significant improvements in results. A quantity that gives a concentration of 1–10 ppm is normally adequate.

The use in combination with polymers or copolymers having carboxyl substituted ethylenic hydrocarbons as monomer components permits outstanding results to be obtained despite the addition of relatively small amounts, even in water or aqueous systems in which fully adequate effects cannot be obtained by the use of one or the other of these components alone. This is of great significance for industrial applications.

Not only is the scale inhibitor according to the present invention superior in terms of cost and the requisite production equipment on account of its use of inexpensive polysaccharides and oxidizing agents and the ease of performing the synthesis reaction, but is also extremely effective against a broad variety of scales, even exhibiting excellent deposition inhibiting effects against silica-type scales, which have been almost entirely resistant to previous chemicals.

The present invention is further illustrated through the following preparations and examples.

PREPARATION 1

Scale inhibitors according to the present invention were synthesized using cornstarch as the polysaccharide and sodium hypochlorite as the oxidizing agent. These were reacted, at a ratio in mole equivalents of the cornstarch to the effective chlorine in the sodium hypochlorite of from 1:1 to 1:4, in a beaker containing a 20% sodium hydroxide solution for 4 hours at a temperature of 30° C. and a pH held at 9. When a portion of the starting materials was insoluble, the mixture was heated and dissolved at 90° C. for 30 minutes, then left to cool, following which it was adjusted to pH 6.5 with 15% hydrochloric acid solution in each case.

A five-fold quantity of ethanol was added to the reaction solution, giving a precipitate. This was reprecipitated three times from ethanol and the absence of chlorine ions verified, following which the ethanol was removed from the solution by decantation, leaving a viscous substance. This substance was dried in vacuum at 45° C. The yield was calculated, the content of carboxyl group-bearing units in the product measured by ion-exchange alkali titration method, and the viscosity determined with a B-type viscometer. The results are given in Table 1.

TABLE 1

| Compound No. (the invention) | Cornstarch added (g) (anhydrous equiv.) | Sodium hypochlorite added (g) (effective chlorine, 6.04% w/w) | Yield (g) (anhydrous equiv.) | Carboxyl group-bearing unit content, (%) | Viscosity, (cps) (20% aqueous solution at 25° C.) |
|---|---|---|---|---|---|
| (1) | 16.2 | 117.8 | 15.8 | 13.5 | 5.1 |
| (2) | 16.2 | 235.0 | 16.1 | 43.2 | 3.5 |
| (3) | 16.2 | 352.5 | 16.2 | 58.5 | 2.1 |
| (4) | 16.2 | 470.0 | 16.1 | 76.5 | 2.8 |

PREPARATION 2

Scale inhibitors according to the present invention were synthesized using cellulose, carboxymethyl cellulose (CMC), sawdust, dextrin, and sodium alginate as the polysaccharides, and sodium hypochlorite as the oxidizing agent. The reaction conditions, method of product purification, and analytic tests were all the same as in Preparation 1, but the ratio in equivalents of glucose units within the polysaccharide to the effective chloride within the sodium hypochlorite was set at about 1:4 in all cases. The results are given in Table 2.

TABLE 2

| Compound No. (the invention) | Polysaccharide Type | Amount added (g) (anhydrous equiv.) | Sodium hypochlorite added (g) (effective chlorine, 5.94% w/w) | Yield (g) (anhydrous equiv.) | Carboxyl group-bearing unit content (%) | Viscosity (cps) (20% aqueous solution at 25° C.) |
|---|---|---|---|---|---|---|
| (5) | Cellulose (Sanyo-Kokusaku Pulp Co., Ltd,; tradename, [Pulflock] W-1) | 16.2 | 470 | 11.8 | 63.0 | 4.0 |
| (6) | CMC (Shikoku Chemicals Corporation; trademark, Caselos TL; degree of etherification, 0.55; purity, 53%) | 37.2 | 470 | 19.9 | 78.1 | 3.0 |
| (7) | Sawdust (Shimada Shokai K.K.; tradename, Cellulosin; cellulose content, about 70%) | 23.1 | 470 | 8.4 | 54.9 | 4.8 |
| (8) | Dextrin (Matsuya Kagaku Kogyo K.K.; tradename, Hakushoku Dextrin #1; purity, 51%) | 31.8 | 470 | 16.0 | 76.5 | 2.1 |
| (9) | Sodium alginate (Kamogawa Chemical Industry Co., Ltd.; tradename, Duck Algin NSPLL) | 17.6 | 470 | 17.1 | 75.0 | 3.3 |

Note:
Compounds (5) and (7) were synthesized at a reaction temperature of 60° C.

PREPARATION 3

Scale inhibitors according to the present invention were synthesized using cornstarch as the polysaccharide, and using hydrogen peroxide and ferrous sulfate or ferric sulfate as the oxidizing agents.

The ratio in mole equivalents of the cornstarch to hydrogen peroxide was set at 1:4, and the reaction carried out for two hours at 25° C. and a pH 2-4 in 15% hydrochloric acid solution. After the reaction, the pH was adjusted to 6.5 with 20% sodium hydroxide solution. The reaction conditions, method of product purification, and analytic tests were all the same as in Preparation 1. The results are shown in Table 3.

TABLE 3

| Compound No. (the invention) | Cornstarch added (g) (anhydrous equiv.) | Hydrogen peroxide (35% w/w) added (g) | Iron salts Type | Iron salts Amount added (g) | Yield (g) (anhydrous equiv.) | Carboxyl group-bearing unit content (%) | Viscosity (cps) (20% aqueous solution at 25° C.) |
|---|---|---|---|---|---|---|---|
| (10) | 16.2 | 38.5 | Ferrous | 0.1 | 5.8 | 68.5 | 2.3 |

TABLE 3-continued

| Compound No. (the invention) | Cornstarch added (g) (unhydrous equiv.) | Hydrogen peroxide (35% w/w) added (g) | Iron salts Type | Iron salts Amount added (g) | Yield (g) (anhydrous equiv.) | Carboxyl group-bearing unit content (%) | Viscosity (cps) (20% aqueous solution at 25° C.) |
|---|---|---|---|---|---|---|---|
| (11) | 16.2 | 38.5 | sulfate (FeSO$_4$.7H$_2$O) Ferric sulfate (FeSO$_4$.9H$_2$O) | 0.5 | 8.1 | 72.3 | 2.5 |

PREPARATION 4

Scale inhibitors according to the present invention were synthesized by a two-step oxidation process using cornstarch, cellulose, and carboxymethyl cellulose (CMC) as the polysaccharides, and meta-periodic and sodium chlorite as the oxidizing agents.

To 20 grams of the polysaccharide, as calculated in terms of the pure anhydrous equivalent, were added 32 grams of meta-periodic acid and 625 ml of demineralized water, and pH adjusted to 3 with 35% hydrochloric acid solution, and this mixture stirred for seven days at room temperature, following which the precipitate was filtered off. (When CMC was used, precipitation was carried out with acetone, then followed by filtration.) The precipitate was suspended in 320 ml demineralized water, then 36 g sodium chlorite and 11 ml glacial acetic acid added. This mixture was stirred for 4 hours, following which the pH was adjusted to 6.5 with 50% sodium hydroxide solution. A 5-fold amount of acetone was added to the reaction solution, giving a precipitate. This was obtained as a viscous substance by decantatation of the solution, then dried in vacuum at 45° C. The yield was calculated, and the contents of carboxyl group-bearing units and viscosities determined in the same manner as in Preparation 1. The results are presented in Table 4.

concentration of dissolved calium carbonate present in the filtrate determined by titration with 1/100 mole of EDTA. The results obtained were used to calculate the amount of deposition prevented. These results are shown in Table 5.

The properties of the commercially available oxidized starch and the chemicals used in Examples 1 through 6 for comparison are as follows.
Commercial oxidized starch:
 Manufacturer: Nihon Shokuhin Kako Co., Ltd.
 Trade name: Nisshoku MS #3400
 Content of carboxyl group-bearing units: 5.8%
 Viscosity of 20% solution: 20 CPS (at 25° C. with a B-type viscometer)
Comparative chemicals:
 Sodium polyacrylate: Nippon Junyaku Co., Ltd.
 Viscosity of 20% solution: 14.0 cps (at 25° C. with a B-type viscometer)
Polymaleic anhydride:
 Manufacturer: Ciba-Geigy
 Viscosity of 20% solution: 3.2 cps (at 25° C. with B-type viscometer)

TABLE 4

| Compound No. (the invention) | Polysaccharide used | Yield (g) (anhydrous equiv.) | Carboxyl group-bearing unit content (%) | Viscosity (cps) (20% aqueous solution at 25° C.) |
|---|---|---|---|---|
| (12) | Cornstarch | 18.5 | 81.0 | 4.0 |
| (13) | Cellulose (Sanyo-Kohusak Pulp Co., Ltd.; trademark, Pulpfock W-1) | 16.2 | 74.1 | 4.9 |
| (14) | CMC (Shikoku Chemicals Corporation; trademark, Caselose TL; degree of etherification, 0.55; purity, 51%) | 17.5 | 78.0 | 3.3 |

EXAMPLE 1

Tests were conducted to determine the effectiveness of the scale inhibitors according to the present invention obtained in Preparations 1 through 4 and of commercially available starch oxidized with sodium hypochlorite for inhibiting the deposition of calcium carbonate. Ten ml of a 14.7 g/l soluton of calcium chloride (CaCl$_2$.2H$_2$O) was placed in a beaker and the chemical added to a given concentration. Next, 10 ml of a 16.8 g/l solution of sodium bicarbonate (NaHCO$_3$) was added, and the total volume brought to 100 ml with demineralized water. This corresponds to a 1000 ppm solution of calcium carbonate (CaCO$_3$). The test solution was left standing at 50° C. for 24 hours, then filtered and the

TABLE 5

| Scale inhibitors used in tests (Compound Nos. in Preparations 1-4) | Concentration (ppm) | Amount of calcium carbonate deposition prevented (ppm CaCO$_3$) |
|---|---|---|
| (1) | 5 | 93 |
|  | 10 | 163 |
|  | 20 | 322 |
| (2) | 2.5 | 159 |
|  | 5 | 266 |
|  | 10 | 336 |
| (3) | 2.5 | 225 |
|  | 5 | 308 |
|  | 10 | 391 |
| (4) | 2.5 | 299 |
|  | 5 | 351 |
|  | 10 | 402 |
| (5) | 2.5 | 213 |
|  | 5 | 315 |
|  | 10 | 380 |

TABLE 5-continued

| Scale inhibitors used in tests (Compound Nos. in Preparations 1–4) | Concentration (ppm) | Amount of calcium carbonate deposition prevented (ppm CaCO3) |
|---|---|---|
| (6) | 2.5 | 306 |
|  | 5 | 380 |
|  | 10 | 445 |
| (7) | 2.5 | 139 |
|  | 5 | 275 |
|  | 10 | 330 |
| (8) | 2.5 | 306 |
|  | 5 | 336 |
|  | 10 | 402 |
| (9) | 2.5 | 306 |
|  | 5 | 355 |
|  | 10 | 375 |
| (10) | 2.5 | 201 |
|  | 5 | 315 |
|  | 10 | 336 |
| (11) | 2.5 | 259 |
|  | 5 | 318 |
|  | 10 | 360 |
| (12) | 2.5 | 291 |
|  | 5 | 425 |
|  | 10 | 470 |
| (13) | 2.5 | 235 |
|  | 5 | 342 |
|  | 10 | 388 |
| (14) | 2.5 | 269 |
|  | 5 | 355 |
|  | 10 | 406 |
| Commercially available oxidized starch | 20 | 24 |
|  | 40 | 172 |
|  | 80 | 207 |
| Comparative Examples  Sodium polyacrylate | 2.5 | 120 |
|  | 5 | 306 |
|  | 10 | 348 |
| Polymaleic anhydride | 2.5 | 232 |
|  | 5 | 322 |
|  | 10 | 388 |

Note:
Amount of calcium carbonate deposition prevented (ppm CaCO3) = [concentration of dissolved calcium carbonate (ppm CaCO3) when scale inhibitor added] − [concentration of dissolved calcium carbonate (ppm CaCO3) when not added]

EXAMPLE 2

Tests were conducted to determine the effectiveness of the scale inhibitors according to the present invention obtained in Preparations 1 through 4 at inhibiting the deposition of calcium sulfate. Ten ml of a 108.1 g/l solution of calcium chloride ($CaCl_2.2H_2O$) was placed in a beaker and scale inhibitor added to a given concentration, following which 10 ml of a 104.4 g/l solution of sodium sulfate ($Na_2SO_4$) was added, and the solution brought to 100 ml with demineralized water. This corresponds to a 10,000 ppm solution of calcium sulfate ($CaSO_4$). After leaving the test solution to stand at 50° C. for 24 hours, this was filtered, the concentration of dissolved calcium sulfate in the filtrate determined by titration with 1/100 mole of EDTA, and from this, the amount of deposition prevented calculated. The results are given in Table 6.

TABLE 6

| Scale inhibitors used in tests (Compound Nos. in Preparations 1–4) | Concentration (ppm) | Amount of calcium sulfate deposition prevented (ppm CaSO4) |
|---|---|---|
| (2) | 5 | 637 |
|  | 10 | 1194 |
|  | 20 | 3617 |
| (4) | 5 | 843 |
|  | 10 | 1988 |
|  | 20 | 4874 |
| (6) | 5 | 918 |
|  | 10 | 1915 |
|  | 20 | 5380 |
| (8) | 5 | 1030 |
|  | 10 | 1618 |
|  | 20 | 4450 |
| (9) | 5 | 1215 |
|  | 10 | 1862 |
|  | 20 | 3332 |
| (12) | 5 | 1415 |
|  | 10 | 1972 |
|  | 20 | 5860 |
| (13) | 5 | 1181 |
|  | 10 | 1635 |
|  | 20 | 5013 |
| (14) | 5 | 1212 |
|  | 10 | 1765 |
|  | 20 | 4721 |
| Comparative Examples  Sodium polyacrylate | 5 | 1159 |
|  | 10 | 1826 |
|  | 20 | 4729 |
| Polymaleic anhydride | 5 | 0 |
|  | 10 | 632 |
|  | 20 | 562 |

Note:
Amount of calcium sulfate deposition prevented (ppm CaSO4) = [concentration of dissolved calcium sulfate (ppm CaSO4) when scale inhibitor added] − [concentration of dissolved calcium sulfate (ppm CaSO4) when not added]

EXAMPLE 3

The effectiveness of the scale inhibitors according to the present invention at preventing scale deposition was tested using simulation water corresponding to cooling water during high-concentration operation. A simulation cooling water of a pH 8.2 and containing 240 ppm of calcium ions, 60 ppm of magnesium ions, and 730 ppm of bicarbonate ions was prepared using the reagents calcium chloride ($CaCl_2.2H_2O$), magnesium sulfate ($MgSO_4.7H_2O$), and sodium bicarbonate ($NaHCO_3$), and used as the test solution. In addition, another simulation cooling water containing 250 ppm of silicate ion in the form of sodium metasilicate ($Na_2SiO_3.9H_2O$), and adjusted with hydrochloric acid solution to a pH 8.2, was prepared. Three liters of test solution to which the chemical has already been added to a given concentration was placed in a beaker, and stirred by means of a magnetic stirrer. A 300 W copper pipe heater (heat transfer area, 14.4 cm$^2$) was immersed in the test solution, the voltage set at 60 V with a transformer, and scale deposition induced on the surface of the heater. Cooling water was circulated through the cooling pipes at a rate of 1.5 liters per minute to set the temperature within the beaker at 30° C. To prevent clouding of the solution, fresh test solution was fed in at a rate of one liter per hour and test solution was withdrawn of the same rate. The time for each test run was set at 5 hours. Following the run, the heater was immersed in 5% hydrochloric acid solution, and the dissolved portion titrated with 1/100 mole of EDTA, and from this, the amount of $CaCO_3$ deposition per 100 cm$^2$ was determined. The amount of silica deposition per 100 cm$^2$ was determined by scraping off the remaining insoluble deposits left on the heater. The results are given in Table 7.

TABLE 7

| Scale inhibitor used in test (Compound Nos. from Preparations 1-4) | Concentration (ppm) | Addition of silicate to test solution | Amount of scale deposition | |
|---|---|---|---|---|
| | | | Amount dissolved in hydrochloric acid ($CaCO_3$.g/100 $cm^2$) | Amount insoluble in hydrochloric acid (silica, g/100 $cm^2$) |
| (2) | 10 | Added | 0.27 | Less than 0.03 |
| | 10 | Not added | 0.08 | |
| (4) | 10 | Added | Less than 0.01 | Less than 0.03 |
| | 10 | Not added | Less than 0.01 | |
| (6) | 10 | Added | Less than 0.01 | Less than 0.03 |
| | 10 | Not added | Less than 0.01 | |
| (12) | 10 | Added | Less than 0.01 | Less than 0.03 |
| | 10 | Not added | Less than 0.01 | |
| Inhibitor not added | | Added | 1.28 | 0.47 |
| | | Not added | 0.32 | |
| Polymaleic anhydride | 10 | Added | 0.92 | 0.30 |
| | 10 | Not added | 0.13 | |

EXAMPLE 4

Tests were run using simulation water corresponding to brine in geothermal plants to determine the effectiveness of the compounds synthesized according to the present invention in preventing scale deposition. A simulation geothermal brine adjusted to a pH 7.0 with hydrochloric acid and containing 210 ppm of calcium ions, 10 ppm of magnesium ions, 680 ppm of carbonate ions, and 800 ppm of silicate ions was prepared using the reagents sodium chloride (NaCl), potassium chloride (KCl), sodium carbonate ($Na_2CO_3$), calcium chloride ($CaCl_2.2H_2O$), sodium metasilicate ($Na_2SiO_3.9H_2O$), and magnesium chloride ($MgCl_2.6H_2O$), and used as the test solution. The amount of scale deposition was measured using the same testing apparatus and test conditions as in Example 3. The results are presented in Table 8.

TABLE 8

| Scale inhibitor used in test (Compound Nos. from Preparations 1-4) | Concentration (ppm) | Amount of scale deposition | |
|---|---|---|---|
| | | Amount dissolved in hydrochloric acid ($CaCO_3$.g/100 $cm^2$) | Amount insoluble in hydrochloric acid (Silica, g/100 $cm^2$) |
| (2) | 10 | Less than 0.01 | 0.09 |
| (4) | 10 | Less than 0.01 | Less than 0.03 |
| (6) | 10 | Less than 0.01 | Less than 0.03 |
| (12) | 10 | Less than 0.01 | Less than 0.03 |
| Inhibitor not added | | 0.16 | 0.48 |
| Sodium polyacrylate | 10 | Less than 0.01 | 0.29 |

EXAMPLE 5

Tests were run using simulation seawater to determine the effectiveness of the scale inhibitors according to the present invention in preventing scale deposition. A simulation seawater containing 200 ppm of calcium ions, 790 ppm of magnesium ions, and 2,900 ppm of bicarbonate ions was prepared from the reagents sodium chloride (NaCl), magnesium sulfate ($MgSO_4.7H_2O$), potassium chloride (KCl), calcium chloride ($CaCl_2.2H_2O$), and sodium bicarbonate ($NaHCO_3$), for use as the test solution. One liter of the test solution to which the chemical had been pre-added to a given concentration was placed in a beaker, and stirred by means of a magnetic stirrer. In this was immersed a 100 V, 300 W copper pipe heater (heat transfer surface area, 14.4 $cm^2$), the area about the heater made to boil, and scale deposition induced on the heater surface. To prevent clouding of the test solution, the solution was externally cooled and the test solution maintained at a temperature of 70°-75° C. The deposited scales were dissolved by immersing the heater in 5% hydrochloric acid solution, and the calcium and magnesium portions were determined by titration with 1/100 mole of EDTA. These figures were represented as the amount of deposition per 100 $cm^2$ of $CaCO_3$ and $Mg(OH)_2$, respectively. The results are given in Table 9.

TABLE 9

| Scale inhibitor used in test (Compound Nos. from Preparations 1-4) | Concentration (ppm) | Amount of scale deposition | |
|---|---|---|---|
| | | $CaCO_3$ (g/100 $cm^2$) | $Mg(OH)_2$ (g/100 $cm^2$) |
| (2) | 20 | 0.569 | 1.007 |
| (4) | 20 | 0.292 | 0.783 |
| (6) | 20 | 0.292 | 0.889 |
| (12) | 20 | 0.236 | 0.486 |
| Inhibitor not added | — | 1.722 | 2.069 |
| Sodium polyacrylate | 20 | 0.522 | 1.506 |
| Polymaleic anhydride | 20 | 0.292 | 1.381 |

EXAMPLE 6

Cornstarch (162 grams anhydrous equivalent) was suspended in 500 ml of demineralized water, and the suspension placed in a 1-liter four-necked flask and bubbled through with 200 grams of chlorine at 25° C. for one hour while stirring and keeping the pH at 8 with 50% sodium hydroxide solution. After maintaining the pH at 8 for 4 hours, the suspension was left to stand for 20 hours at room temperature while stirring. The reaction solution was brought to one liter with demineralized water. This was analyzed, in the same manner as in preparation 1, and found to be a 16.0% solution of oxidized polysaccharide having a content of carboxyl group-bearing units of 63.5%. This solution was used as is, and tests conducted on the model plant of a circulating type cooling water system. The model plant had a water capacity of 0.97 $m^3$. A heat exchanger (made of SUS 304, with a heat transfer surface area of 0.707 $m^2$) for measuring the amount of scale deposition was placed inside the system, and the outlet temperature set at 50° C. In addition, a by-pass was provided within the system, and the cooling tower returns and feedwater temperatures set at 37°–38° C. and 30°–31° C., respectively. Tests were run for 20 days in each test area, and the water balance set such that the concentration factor of the cooling water was 6. After 20 days, the amount of scale deposition in the inlet, central, and outlet section of the heat exchange tubes were measured, and the average value given as the rate of deposition (mcm=mg/cm$^2$/month). The composition of the scales was also determined. The results are given in Table 10.

TABLE 10

| Scale inhibitor used in test | Concentration maintained (ppm) | Rate of scale deposition (mcm) | Composition of scales (% dry weight) | | | |
|---|---|---|---|---|---|---|
| | | | Ignition loss | Insoluble matter in acid | C$_3$CO$_3$ | M$_g$O |
| 16.0% solution of oxidized polysuccharide synthesized in this example | 30 (4.8 as effective component) | 14.1 | 31.3 | 29.1 | 30.2 | 8.9 |
| | 60 (9.6 as effective component) | 4.4 | 46.6 | 24.5 | 22.9 | 8.5 |
| Scale inhibitor not added | | 106.0 | 21.1 | 25.5 | 43.3 | 12.1 |
| Sodium polyacrylate | 5 | 20.6 | 28.1 | 36.5 | 22.1 | 7.7 |
| Polymaleic anhydride | 5 | 12.5 | 27.3 | 42.4 | 26.8 | 9.5 |

What is claimed is:

1. A method for inhibiting scale in water and aqueous systems, comprising adding to said water or aqueous systems an oxidized polysaccharide in an amount in the range of 1 to 20 ppm, wherein said polysaccharide contains as the essential structural units, at least 10% of carboxyl group-bearing units of the formula:

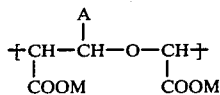

where A is CH$_2$OR, R is H, (CH$_2$)$_n$COOM or COOM, M is H, an alkali metal ion, or an ammonium group, n is a integer from 1 to 3, and said oxidized polysaccharide is obtained by the oxidative cleavage of a polysaccharide containing 6-membered monosaccharide rings having vicinal hydroxy groups with an oxidizing agent.

2. A method according to claim 1, wherein said oxidized polysaccharide contains at least 40% of carboxyl group-bearing units.

3. A method according to claim 1, wherein the polysaccharide containing 6-membered monosaccharide rings having vicinal hydroxy groups is a starch, dextrin, cellulose, sawdust, polyuronic acid, agar, natural gum, or a derivative thereof obtained by partial hydrolysis, esterification, etherification, or carboxylation.

4. A method according to claim 1, wherein the polysaccharide containing 6-membered monosaccharide rings having vicinal hydroxy groups is a starch, cellulose, or a carboxymethyl ether compound.

5. A method according to any of claims 1 and 2, wherein sodium hypochlorite is used as an oxidizing agent in an amount such that the mole equivalents of the polysaccharide containing 6-membered rings having vicinal hydroxy groups to the effective chlorine content of the sodium hypochlorite is from 1:1 to 1:4, and the oxidative cleavage is conducted for one to several hours at room temperature or under heating, and at a pH in the range of 7–10.

* * * * *